United States Patent [19]
Chang et al.

[11] Patent Number: 5,793,895
[45] Date of Patent: Aug. 11, 1998

[54] INTELLIGENT ERROR RESILIENT VIDEO ENCODER

[75] Inventors: Yuan-Chi Chang, Berkeley, Calif.; Zon-Yin Shae, South Salem; Marc Hubert Willebeek-LeMair, Millwood, both of N.Y.

[73] Assignee: International Business Machines Corporation, Armonk, N.Y.

[21] Appl. No.: 697,652

[22] Filed: Aug. 28, 1996

[51] Int. Cl.$^6$ .................. G06K 9/36; G06K 9/46
[52] U.S. Cl. .................. 382/236; 348/407; 382/239
[58] Field of Search .................. 382/235, 236, 382/239; 348/397, 402, 407, 413, 416, 415, 431, 699, 419; 358/428, 430, 433

[56] References Cited

U.S. PATENT DOCUMENTS 5,136,371  8/1992  Savatier et al. .................. 348/419
5,260,783  11/1993  Dixit .................. 348/415

*Primary Examiner*—Joseph Manouso
*Assistant Examiner*—Timothy M. Johnson
*Attorney, Agent, or Firm*—Douglas W. Cameron; Ronald L. Drumheller

[57] ABSTRACT

A method and apparatus for compressing video data to improve its tolerance to error, especially with a low bit rate network. With this invention video data is divided into a number of frames and each frame is divided into a number of macroblocks. A dependency count is assigned to each macroblock, and if the dependency count for the macroblock exceeds or is equal to a threshold, the dependency block is intra-coded using low bit rate coding algorithm. If the dependency count is below the threshold, the macroblock is inter-coded.

19 Claims, 3 Drawing Sheets

INTELLIGENT ERROR RESILIENT VIDEO ENCODER

DESCRIPTION

1. Technical Field

This invention relates to compression of video image data for transmission over congested internet networks, especially those networks having low data rates.

2. Description of the Prior Art

As the widely popular World Wide Web evolves and becomes a part of our daily life and powerful multimedia desktops replace the images of dumb, typewriter-like terminals as the new generation computers, the two forces have been merging to create a new era of communications and computing. At the center of the stage is the ability to access and communicate in multimedia, like audio, video, image and data. Today's personal computers have reached the point where computationally intensive signal processing functions can be performed in software rather than expensive hardware. Despite technology advances in communications we have seen little increase of residential communication bandwidths. Many people still rely on phone lines to access the Internet. The available bandwidth of a phone line is more than a thousand times lower than the bandwidth of an uncompressed NTSC video stream. The need for efficient low bit-rate video coding thus arises. The ITU-T H.263 video compression standard [1, 2] provides a solution to the above need for low bit-rate communication channels. Reference 1 is hereby incorporated herein by reference. It exploits the temporal and spatial redundancies in a video sequence to greatly reduce the required bandwidth. For example, two consecutive frames in a sequence often differ slightly. Compression techniques can thus take advantage of this redundancy by only encoding the differences between the two frames. This differential coding, however, creates dependencies between successive frames, which may cause error propagation when video data gets lost in the middle of the transmission. To prevent serious quality degradation, it is important to increase the error resilience of the compressed stream.

There is a significant amount of prior research on error resilient video coding. The proposed schemes vary from enhancement of the coded architecture, [3–7] to bit stream packetization and error control coding [8–10] or more often, a combination of the two [11–14] schemes. The ultimate solution, however, often lies in the understanding of the nature of the video application, its performance requirements, its target transmission media, and the system limitations. For example, forward error correction (FEC) is more effective for random bit errors and less effective for packet losses. Non-real-time applications prohibit the use of closed-loop encoding control, like adaptive resolution and quality adjustments, which must adapt to channel conditions in real time. In multicast scenarios, closed-loop error control may not be feasible due to scalability issues. Data packetizations based on the compressed stream structure may be a favorable choice for real-time unicast applications, but these packetizations can create processing overhead to video server operations.

The first, most robust, video encoding uses I-blocks (intra-coded macroblock) only, or equivalently encode all video frames as intra-coded frames (I-frames). This is the same as encoding the video sequence as a series of independent images. Missing one image does not affect the decoding of other images. This scheme, however, drastically reduces the compression gain and with the low bit rate constraint, the frame rate is forced to drop. The picture quality degrades as well because higher quantization levels are used to reduce the number of bits needed to encode an I-frame.

The second, most robust, video encoding can be achieved by periodically refreshing the image by inserting I-frames. Because an I-frame does not have dependence on the previous frame, it can effectively terminate the error propagation. In the MPEG standard, every Group-of-Picture (GOP) structure has an I-frame. The size of a GOP is not defined but the most commonly used values range between 12 and 15 frames. Therefore, an error propagation is terminated in at most 15 frames. The purpose of having the GOP in MPEG is mainly for video browsing but it also increases the robustness of the MPEG stream. For low bit-rate applications, however, the scheme of I-frame insertions is less favorable because it generally requires more bits to represent an I-frame. An I-frame insertion also uses up the bit rate budget of multiple frames and causes the encoder to skip several consecutive frames, which may create motion jitter as the video plays back.

The third way to improve robustness in the compressed video stream is to insert I-blocks incrementally to refresh the image. This feature in H.263 is used in place of I-frame insertions. In H.263, I-blocks are used to update portions of a frame incrementally to achieve a complete update. This helps maintain smoother processing and bandwidth requirements between frames. To recover from the accumulation of DCT mismatch errors, the standard requires I-block insertions at least once every 132 coded frames, and this minimum insertion interval is defined as the force update period. By shortening the force update period, the error recovery can thus be speeded up. This scheme, however, does not have natural synchronization points. I-block insertions are scattered across different frames, and one cannot get the video totally reconstructed in one frame.

The trade-off among the above three solutions is between video quality, smooth bandwidth utilization, and error recovery speed. The first solution generates the poorest quality (lowest frame rate) video, but it always recovers from errors in one frame. The second solution generates bursty traffic, and it recovers from losses in one I-frame refresh period. The third solution generates a smooth bandwidth profile, but it may take long to recover from packet losses. For most Internet users to benefit from a network video application, it is necessary for the application to generate smooth traffic to be carried by phone lines, which are constant bit rate transmission channels.

SUMMARY OF THE INVENTION

It is therefore an objective of this invention to increase the error resilience of a compressed data stream that is transmitted over a low bit rate network.

It is a more specific objective of this invention to provide for fast recovery from packet losses in a congested network environment.

More specifically with the satisfaction of the previously mentioned objectives of this invention, this invention allows for transmission of video image data over an internet network, which very often uses an ordinary telephone network.

This invention is devised to intelligently choose important macroblocks which have more impact on successive frames than others. The chosen macroblocks are then updated more frequently to provide greater error resilience.

Accordingly, this invention provides for a method of compressing data to improve its tolerance to error. With this invention data is divided into a number of frames, where each of the frames is divided into macroblocks. Each macroblock is then assigned a dependency count, where the count is a measure of the dependency of macroblocks in subsequent frames. If the dependency count of the blocks exceeds a selected threshold, then intra-coding of the block is applied. If the dependency count of the block does not exceed the threshold, then inter-coding is applied to the block. With intra-coding the data in the block is compressed with no dependence on any other blocks, while with inter-coding the macroblock is compressed as a difference to other blocks.

DESCRIPTION OF THE PREFERRED EMBODIMENT

Figure 1:
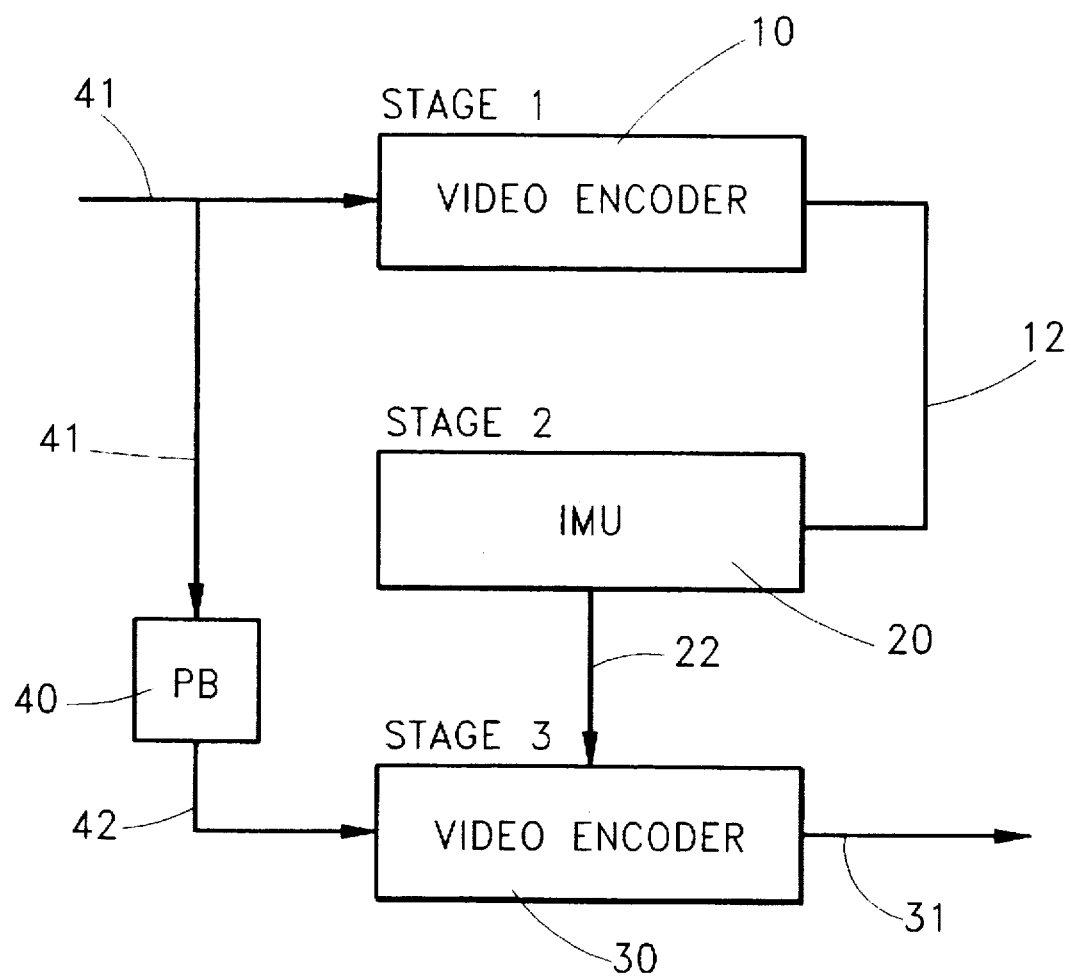
FIG. 1 is a schematic illustration of the 3-stage method and apparatus of compressing video data in accordance with the invention.

FIG. 1 gives a high level view of the new video encoding process. It contains three software modules. The first (10) and the third (30) stages are the actual video encoders, which can use H.263, H.261, or other well known video compression algorithms.

In this embodiment H.263 and H.261 compression is preferred. The second stage (20) is the intelligent macroblock updating (IMU) module. A video is divided into a sequence of frames, each sequence being referred to as a window, which may for example have 200 frames. We briefly describe the encoding procedure of the first and third stages. The video encoders 10 and 30 first partition a video image into a set of macroblocks. A macroblock is, for example, an array of 16×16 pixels; however, it can be any two dimensional array of pixels. For each macroblock, the coding control function evaluates the result of the motion estimation of the macroblock and decides either to encode the difference between the macroblock and its previous occurrence, or encode the new value independently of any previous data. The prior case is referred to as inter-coding, while the latter is referred to as intra-coding. For each inter-coded block, a motion vector is associated with it to point to the location of its previous occurrence. An inter-coded block is often abbreviated as a P-block and an intra-coded block is abbreviated as an I-block. I-block encoding exploits only the spatial redundancy within the block, while P-block encoding exploits both the temporal and spatial redundancies of the video.

As raw video comes in (41), it is first compressed in the first stage (10). The compressed data (12) is fed into the second stage (20), where the macroblock updating analysis is performed. The second stage then outputs the encoding control information (22) to the third stage (30). The third stage then encodes the same video sequence, which now resides in the picture buffer (40). The second encoding is based on the encoding control information (22). The output of the third stage is the final compressed video data stream (31).

The IMU module (20) analyzes the motion vector information collected in the first stage (10) to identify macroblocks which have the most impact on successive frames. These macroblocks are selected to be encoded as intra-coded blocks (I-blocks) in the third stage. The importance of a macroblock is measured by its dependence count, which is defined as the number of blocks depending on it in successive frames. In the following, we use FIG. 2 as an example to illustrate how to construct a dependence graph and calculate dependence counts. A dependence graph is a directed graph in which nodes represent macroblocks, and in which directed arcs 25 represent motion vector references between macroblocks.

Figure 2A:
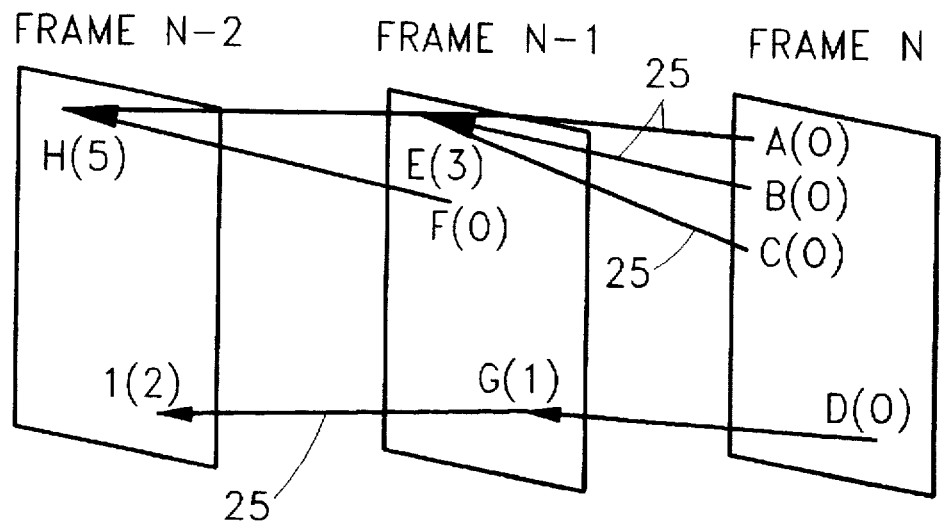
FIG. 2 is a schematic illustration of dependent graphs which are used in the selection of macroblocks for intra-coding.
Figure 2B:
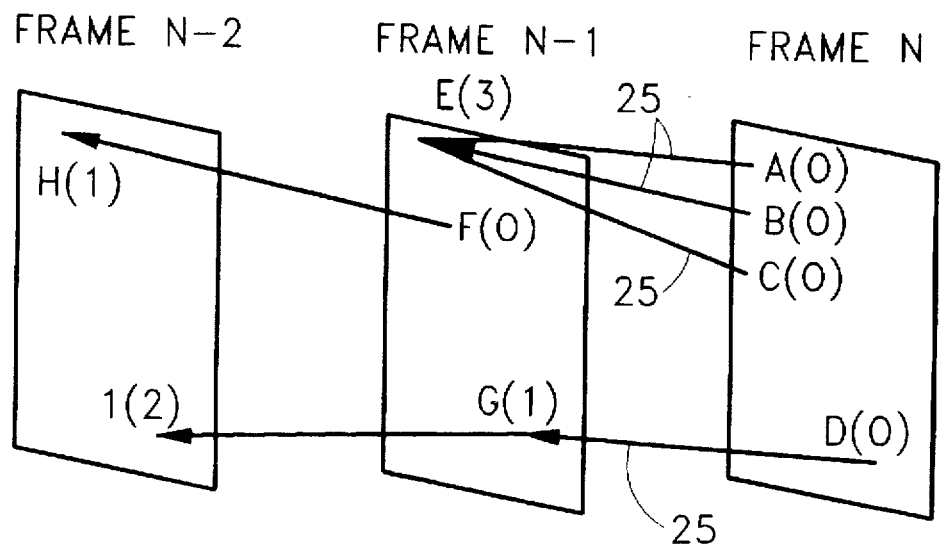

Again, referring to FIGS. 2 and 3, the analysis starts by setting a dependence threshold that represents the maximum number of blocks that may depend on a block. If a block's dependence count exceeds or is equal to the threshold T, it is converted to an I-block. In the following example, we set the threshold to be three (T=3). In FIG. 2.1, we start with the last frame N 414, in a sequence of frames. See also FIG. 3. Blocks A, B, and C all have their dependence counts equal to zero because no other blocks reference them. They, however, all reference block E in frame N-1. Block E thus has its count equal to three 415. For similar reasons, block H in frame N-2 has its dependence count equal to five 415 because blocks A, B, C, E and F depend on it.

The analysis described in this paragraph is repeated until the first frame of a video sequence of a window of frames is reached 414.

For each block in each frame there is a dependency count. If this dependency count exceeds a threshold T, then the block is an eligible candidate for I-block assignment. The total number of these eligible I-blocks is then determined 416. If this total number exceeds a threshold β, then the eligible blocks are sorted 417 according to their dependency count and β of those blocks with the higher dependency counts are selected from the eligible blocks 417. The dependency count of each of the selected β I-blocks is then set to zero for the frame 418. This process is then repeated for each frame until the first frame in the window is reached 414. Next, the IMU selects all the blocks which have dependence counts above or at the threshold, T=3. Since we assigned the threshold to be three, block E is selected. Now, block E does not depend on block H in frame N-2 anymore because an I-block is inserted at this location. The dependence count of block H thus drops from five to one. The updated dependence counts after the selection is shown in FIG. 2.2.

The IMU then outputs all the I-block locations to the third stage to finish encoding.

Figure 3:
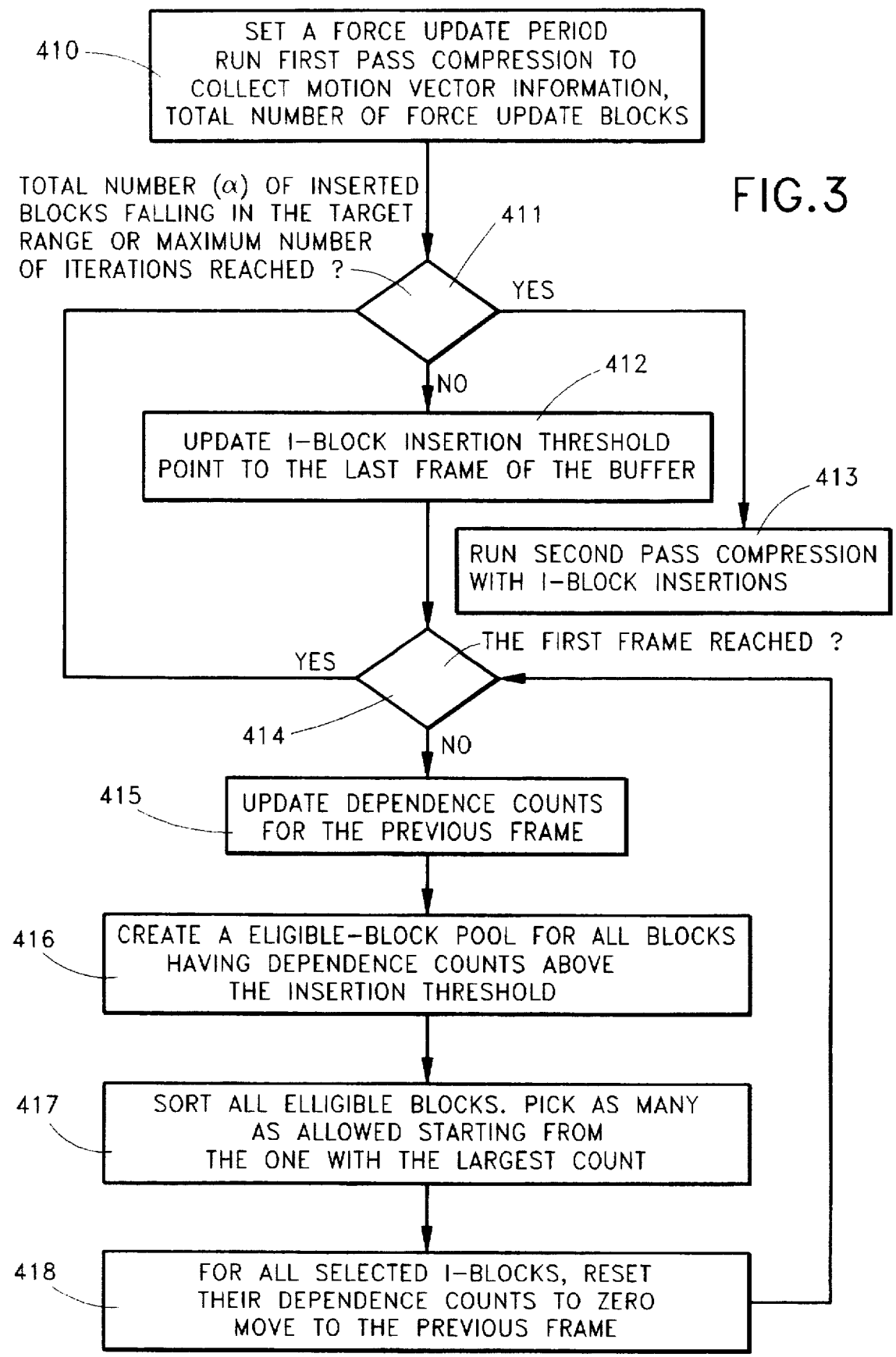
FIG. 3 is a flow diagram of the intelligent macroblock updating algorithm used to implement the intelligent macroblock updating module.

A detailed description of the IMU algorithm is illustrated as a flow diagram in FIG. 3. In the first pass 410, the encoder sets a force update period (FUP), which specifies the maximum number of frames between two consecutive updates of a given macroblock. The FUP must be at most 132 according to the H.263 standard. In our scheme, it depends on the packet loss interval and the session join latency of video multicast. The first constraint requires that the decoded stream fully recover from the packet loss before the next loss hits the data. Assume that each packet contains N frames of compressed video. Given a packet loss frequency of one in every P packets, the recovery has to complete in N*(P−1) frames. Based on our experimental results, it takes approximately eight times the FUP reconstruct a correct frame. One can, thus, calculate the maximum FUP to be around $$N \frac{(P-1)}{8}$$

frames. For a one-percent packet loss rate (P=100) and N=3, the maximum FUP is 37 frames. The other factor on the choice of the FUP is the join latency of video multicast. Let us assume, a join latency of ten seconds. This is similar to the situation where the decoded sequence must recover from a packet loss in ten seconds. Assume the display rate is 15 fps. The maximum FUP is 18 frames, which is smaller than the number we gave for the packet loss frequency. The FUP set in the first pass is the minimum of the two values. In this example, it is set to 18 frames.

In the current implementation, in addition to the motion vectors, two more parameters are extracted in the first pass 410. These two parameters are the total number of inserted force update blocks in an encoded window, $\alpha$, and the maximum number of inserted blocks in a single frame, $\beta$. In the second pass compression, $\alpha$ is used as the target number of I-block insertions. The operation can be interpreted as rearranging their temporal and spatial locations to maximize the robustness to errors without increasing the bandwidth.

One reason for extracting the two parameters is more related to the interaction between rate control functions and I-block insertion decisions. One important assumption of the two-pass compression is that the second pass will encode the exact same set of frames as the first pass did. Without the intervention of rate control, the assumption is correct. However, if the updating analysis inserted too many I-blocks in a single frame, the rate control module might skip frames which were coded in the first pass compression. The dependence graph built on the set of frames from the first pass then is not correct. The second pass compression will insert I-blocks at different locations and diminish the coding efficiency. It is thus important to avoid this situation by limiting the maximum number of I-block insertions to be the same as it is in the first pass.

Then, the total number of I-blocks is compared 411 to $\alpha$. If this number exceeds $\alpha$ then the threshold T is increased. If, however, the total number is less than $\alpha$ then the threshold is decreased 412. When the total number of I-blocks is approximately equal to $\alpha$, then the second pass compression 413 is implemented using video encoder 30. The locations of the I-blocks (Encoding Control Information) are passed 22 to the video encoder 30 to compress frames stored in the picture buffer 40.

References

1. "Video coding for low bitrate communication: draft ITU-T recommendation H.263," Telecommunication Standardization Sector of ITU, May 1996.

2. M. W. Whybray and W. Ellis, "H.263—video coding recommendation for PSTN videophone and multimedia," IEE Colloquium 'Low Bit Image Coding', London, UK, Jun. 6, 1995.

3. P. Haskell and D. G. Messerschmitt, "Resynchronization of motion compensated video affected by ATM cell loss," Proc. ICASSP-92, San Francisco, Calif., vol. 3, pp. 545–8, March 1992.

4. D. Raychaudhuri et al., "ATM transport and cell-loss concealment techniques for MPEG video," Proc. ICASSP-93, New York, N.Y., vol. 1, pp. 117–20, April 1993.

5. A. Hung and T. Meng, "Error resilient pyramid vector quantization for image compression," Proc. ICIP-94, Austin, Tex., vol 1, pp. 583–7, Nov. 1994.

6. J. Moura et al., "Video over wireless," IEEE Personal Communications, vol. 3, no. 1, pp. 44–54, February 1996.

7. S. Narayannaswamy et al., "A low-power, lightweight unit to provide ubiquitous information access application and network support for InfoPad," IEEE Personal Communications, vol. 3, no. 2, pp. 4–17, April 1996.

8. M. Khansari, et al. "Robust low bit rate video transmission over wireless access systems," Proc. ICC-94, New Orleans, La., vol. 1, pp. 571–5, May 1994.

9. I. Richardson and M. Riley, "MPEG coding for error-resilient transmission," 5th International Conference on Image Processing and its Applications, London, UK, July 1995.

10. C. Zhu, "RTP payload for H.263," Internet Draft, February 1996.

11. B. Belzer et al., "Adaptive video coding for mobile wireless networks," Proc. ICIP-94, Austin, Tex., vol. 2, pp.972–6, November 1994.

12. N. Naka et al., "Improved error resilience in mobile audio visual communications," 4th International Conference on Universal Personal Communications, Tokyo, Japan, November 1995.

13. A. Alwan et al., "Adaptive mobile multimedia networks," IEEE Personal Communications, vol. 3, no. 2, pp. 34–51, April 1996.

14. T. Turletti and C. Huitema, "Videoconferencing on the Internet," IEEE Trans. on Networking, vol. 4, no. 3, pp. 340–51, June 1996.

Having thus described our invention, what we claim as new and desire to secure by Letters Patent is:

1. An apparatus for compressing video data with an improved tolerance to error, said video data being divided into a plurality of successive frames, where each of said frames is divided into a plurality of macroblocks, and each of the macroblocks is encoded as either an intra-coded macroblock or as an inter-coded macroblock, an intra-coded macroblock having no dependency upon any coded macroblock in an earlier frame and an inter-coded macroblock having a dependency upon a coded macroblock in an earlier frame, said apparatus comprising:

a. a first encoder stage for comparing macroblocks of different frames to generate motion vectors for said macroblocks;

b. a second encoder stage for receiving said motion vectors and generating therefrom for each macroblock of any particular frame a dependency count indicating how many other macroblocks depend upon said each macroblock in frames subsequent to said each macroblock, each said macroblock that has a dependency count which equals or exceeds a threshold count being selected by said second encoder stage as a macroblock to be intra-coded; and c. a third encoder stage for compressing said video data by intra-coding macroblocks selected by said second encoder stage and inter-coding macroblocks not selected by said second encoder stage.

2. In an encoding method in which successive frames of a video data stream are divided into blocks and each of the blocks is encoded as either an intra-coded block or as an inter-coded block, an intra-coded block having no dependency upon any coded block in an earlier frame and an inter-coded block having a dependency upon a coded block in a different frame, a method of selecting blocks in the video data stream to be encoded as intra-coded blocks, comprising the steps of:

determining for each of the blocks in any particular frame, a dependency count indicating how many other blocks depend upon said each block in frames subsequent to said any particular frame;

selecting for intra-coding, at least blocks in said any particular frame having the highest dependency counts; and selecting for inter-coding, at least blocks in said any particular frame having the lowest dependency counts.

3. The method of claim 2 wherein the video data stream is divided into windows, each window consisting of a plurality of successive frames, and the method is applied to one frame at a time starting at a last frame of any particular window and proceeding backwards one frame at a time until a first frame of said any particular window is reached.

4. The method of claim 3 wherein the blocks in said any particular window that are selected for intra-coding are the blocks having a dependency count that meets or exceeds a threshold number.

5. The method of claim 4 wherein the threshold number is determined such that the total number of blocks that are intra-coded in said any particular window meets a predetermined criterion.

6. The method of claim 5 wherein said predetermined criterion is that the total number of blocks that are intra-coded in said any particular window equals or exceeds a forced update number $\alpha$.

7. The method of claim 5 wherein said predetermined criterion is that the number of blocks that are intra-coded in any frame of said any particular window does not exceed a maximum number $\beta$.

8. The method of claim 2 wherein the blocks in said any particular frame that are selected for intra-coding are the blocks having a dependency count that meets or exceeds a threshold number.

9. The method of claim 8 wherein the threshold number is determined such that the total number of blocks that are intra-coded in said any particular frame meets a predetermined criterion.

10. The method of claim 9 wherein said predetermined criterion is that the number of blocks that are intra-coded in said any particular frame does not exceed a maximum number $\beta$.

11. Improved encoding apparatus in which successive frames of a video data stream are divided into blocks and each of the blocks is encoded as either an intra-coded block or as an inter-coded block, an intra-coded block having no dependency upon any coded block in an earlier frame and an inter-coded block having a dependency upon a coded block in a different frame, the improvement wherein the blocks that are intra-coded are selected so as to reduce block dependency and improve tolerance to error, comprising:

means for determining for each of the blocks in any particular frame, a dependency count indicating how many other blocks depend upon said each block in frames subsequent to said any particular frame;

means for selecting for intra-coding, at least blocks in said any particular frame having the highest dependency counts; and means for selecting for inter-coding, at least blocks in said any particular frame having the lowest dependency counts.

12. The encoding apparatus of claim 11 wherein the video data stream is divided into windows, each window consisting of a plurality of successive frames, and the means for determining and means for selecting are applied to one frame at a time starting at a last frame of any particular window and proceeding backwards one frame at a time until a first frame of said any particular window is reached.

13. The encoding apparatus of claim 12 wherein the blocks in said any particular window that are selected for intra-coding are the blocks having a dependency count that meets or exceeds a threshold number.

14. The encoding apparatus of claim 13 wherein the threshold number is determined such that the total number of blocks that are intra-coded in said any particular window meets a predetermined criterion.

15. The encoding apparatus of claim 14 wherein said predetermined criterion is that the total number of blocks that are intra-coded in said any particular window equals or exceeds a forced update number $\alpha$.

16. The encoding apparatus of claim 14 wherein said predetermined criterion is that the number of blocks that are intra-coded in any frame of said any particular window does not exceed a maximum number $\beta$.

17. The encoding apparatus of claim 11 wherein the blocks in said any particular frame that are selected for intra-coding are the blocks having a dependency count that meets or exceeds a threshold number.

18. The encoding apparatus of claim 17 wherein the threshold number is determined such that the total number of blocks that are intra-coded in said any particular frame meets a predetermined criterion.

19. The encoding apparatus of claim 18 wherein said predetermined criterion is that the number of blocks that are intra-coded in said any particular frame does not exceed a maximum number $\beta$.

* * * * *